United States Patent [19]

Lu et al.

[11] Patent Number: 5,461,125
[45] Date of Patent: Oct. 24, 1995

[54] WATERBORNE CORE-SHELL LATEX POLYMERS

[75] Inventors: Ying-Yuh Lu; Chi-Ming Tseng, both of Woodbury, Minn.; James E. Bunker, Los Osos, Calif.; Terrence E. Cooprider, Woodbury, Minn.; Ronald W. Most, River Falls, Wis.; Gregory J. Stanich, Stillwater, Minn.

[73] Assignee: Minnesota Mining and Manufacturing Company, St. Paul, Minn.

[21] Appl. No.: 56,380

[22] Filed: Apr. 30, 1993

[51] Int. Cl.$^6$ .................................. C08F 265/00
[52] U.S. Cl. .................. 525/293; 523/201; 525/296; 525/279; 525/281; 525/282; 525/283; 525/295; 525/309; 525/902
[58] Field of Search ................. 523/201; 525/902, 525/293, 296, 279, 281, 282, 283, 295, 309

[56] References Cited

U.S. PATENT DOCUMENTS

| | | | |
|---|---|---|---|
| 4,351,875 | 9/1982 | Arkens | 428/290 |
| 4,497,917 | 2/1985 | Upson et al. | 523/201 |
| 4,613,633 | 9/1986 | Sekiya et al. | 523/201 |
| 4,710,525 | 12/1987 | Kraemer et al. | 523/201 |
| 4,894,397 | 1/1990 | Morgan et al. | 523/201 |
| 5,021,469 | 6/1991 | Langerholms | 523/201 |
| 5,210,113 | 5/1993 | Waters | 523/201 |
| 5,225,456 | 7/1993 | Langerbeins et al. | 523/201 |
| 5,273,824 | 12/1993 | Hoshino et al. | 523/201 |

FOREIGN PATENT DOCUMENTS

| | | | |
|---|---|---|---|
| 0035332 | 9/1981 | European Pat. Off. | C09J 3/00 |
| 0308735 | 3/1989 | European Pat. Off. | C08F 263/02 |
| 2355038 | 6/1977 | France | 265/6 |
| 2557574 | 12/1983 | France . | |

Primary Examiner—Edward Cain
Attorney, Agent, or Firm—Gary L. Griswold; Walter N. Kim; Janice L. Dowdall

[57] ABSTRACT

The present invention provides:

A core-shell insert latex composition comprising latex particles, each latex particle comprising:
- (a) a core comprising a (co)polymer comprising (meth-)acrylate ester;
- (b) a shell, surrounding the core, comprising a copolymer, wherein the copolymer comprises:
  - (i) a nitrogen-bearing ethylenically-unsaturated free-radically polymerizable monomer;
  - (ii) at least one (meth)acrylate ester of about a $C_1$ to about a $C_{14}$ alcohol; and
  - (iii) an optional ethylenically-unsaturated free-radically polymerizable silane monomer; wherein the nitrogen-bearing ethylenically-unsaturated free-radically polymerizable monomer comprises from about 15 to about 60 percent by weight of the shell and further wherein the core comprises from about 40 to about 85 percent of the weight of the total core-shell latex particle.

The invention also relates to the use of the core-shell latex composition as a binder or primer for coatings and adhesives.

17 Claims, No Drawings

WATERBORNE CORE-SHELL LATEX POLYMERS

FIELD OF THE INVENTION

This invention relates to waterborne latex polymers produced by a two-stage emulsion polymerization process. The latex particles comprise an inner core comprising a (meth)acrylate copolymer and an outer shell comprising a copolymer of a nitrogen-containing ethylenically-unsaturated monomer, a (meth)acrylate monomer, and an optional monomeric silane coupling agent. Hereinafter these latexes will be referred to as "core-shell latexes." The latex can be used for a number of purposes including use as a binder or primer for coatings and adhesives. For example, for use as a primer the latex can be coated from water onto a substrate to impart additional functionality thereto. For example, for use as a binder the latex can be admixed with other polymeric materials to enhance adhesion thereof to substrates.

BACKGROUND OF THE INVENTION

Aqueous colloidal dispersions of polymer particles having diameters in the range of less than one micron are well-known in the art and are referred to as latexes. Waterborne latexes have found ubiquitous applications in such areas as paint formulations, adhesives, and sizing agents. Latexes are prepared via emulsion polymerization, whereby an emulsion of monomers, surfactants, polymerization initiators, and other additives is subjected to polymerization conditions and the resultant latex is collected. Emulsion polymerization is advantageous for a number of reasons: no undesirable organic solvents are used; the aqueous medium acts to effectively control the heat of the polymerization and provides convenient control over the viscosity of the resultant colloid; a high-molecular-weight polymer is produced; and the latex can be coated directly onto a web or other substrate.

A two-step emulsion polymerization technique is a well-known method of preparing so-called "core-shell" latex polymer systems. Core-shell particles have an inner "core" formed as a first step of the polymerization which can comprise homopolymeric or copolymeric systems, and a "shell" formed as a second step of the polymerization which can comprise homopolymeric or copolymeric systems which are, generally, different from that of the core. In practice, more than one such layer can be built upon a core. Such systems are useful where two or more distinct sets of properties of the final polymer composition are desired.

A core-shell latex comprising a core of ethyl acrylate/methyl methacrylate copolymer surrounded by a shell of a styrene/(meth)acrylate copolymer is described in U.S. Pat. No. 4,894,397. An "inverted core-shell" polymerization process is employed, wherein the first stage the shell and the second stage polymer is incorporated therein to become the core. Latexes disclosed therein are used in coatings, inks, and films.

A core-shell latex for textile treatment comprising (meth)acrylate copolymeric species for both the core and shell is described in U.S. Pat. No. 4,351,875. Both the shell and the core are required to contain a copolymeric "latent crosslinking monomer," generally a (meth)acrylic amide or (meth)acrylic N-alkylolamide which are known to impart self-curing characteristics to compositions containing them. The additional hydroxyl functionality of these monomers is required in order to bind the latex to the texile surface. In addition, the latex core is required to contain a polyfunctional free-radically polymerizable crosslinking agent.

U.S. Pat. No. 5,021,469 discloses a binder for waterbased gloss paints comprising a core-shell emulsion polymer wherein the core is a hard, high $T_g$ composition and the shell is a softer copolymer of at least three components which contains, inter alia, a nitrogen-containing adhesive monomer, one example of which is N-vinylpyrrolidone, although it is not the preferred nitrogenous constituent. The shell is also required to contain an ethylenically-unsaturated carboxylic acid monomer.

An aqueous dispersion of core-shell latex particles for formulation of paints is described in French Patent Application No. FR 2,557,574, in which the core comprises a copolymer of (meth)acrylate and hydrophilic monomers and the shell comprises the same monomers but is constructed such that 50–90% of the hydrophilic monomers reside in the shell, although the shell comprises only 1–15% of the total weight of the latex. Hydrophilic monomers used therein include N-vinyl pyrrolidone, (meth)acrylamide and aminoalkyl (meth)acrylates, as well as other non-nitrogenous monomers. A coating material comprising the latex is described in European Patent Application No. EP 207,854.

Copending U.S. patent application Ser. No. 08/024,636, filed Jan. 27, 1993, assigned to the assignee of the present invention, discloses certain solution-polymerized acrylamide (co)polymers that are useful as binders for microsphere adhesives. The binder materials are not latexes and are coated from organic solvent(s).

SUMMARY OF THE INVENTION

Thus, water-based core-shell latex which can be useful as a binder additive or primer for adhesives or other compositions coated onto a substrate and which are completely solvent-free have not been described. We have discovered core-shell emulsion polymers having a core comprising (meth)acrylate (co)polymers and a shell comprising a copolymer of (meth)acrylate/nitrogen-bearing monomer/optional monomeric silane which are useful as binders for coatings and as primers. We have also discovered coated articles comprising a coating containing said latexes.

The core-shell latex composition of the present invention comprises latex particles, each latex particle comprising:

a) a core comprising a (co)polymer comprising (meth)acrylate ester(s);

b) a shell, surrounding the core, comprising a copolymer, wherein the copolymer comprises:
 (i) a nitrogen-bearing ethylenically-unsaturated free-radically polymerizable monomer;
 (ii) at least one (meth)acrylate ester of about a $C_1$ to about a $C_{14}$ alcohol; and
 (iii) an optional ethylenically-unsaturated free-radically polymerizable silane monomer; wherein the nitrogen-bearing ethylenically-unsaturated free-radically polymerizable monomer comprises from about 15 to about 60 percent by weight of the shell and further wherein the core comprises from about 40 to about 85 percent of the weight of the total core-shell latex particle.

The latex particles of the invention are particularly characterized by the high concentration of nitrogen-bearing monomer in the shell portion of the latex particle, which imparts excellent binding of the latex to carboxylated adhesives.

The core-shell latex of the invention can be prepared by a two-stage, or sequential, polymerization technique.

This invention also provides for coated substrates in which the core-shell latex of the invention is coated on a suitable substrate to form a film to act as a primer. This invention also provides for coated substrates in which the core-shell latex is admixed with a coating composition to act as a binder and the mixture is coated on a suitable substrate.

DETAILED DESCRIPTION OF THE INVENTION

I. Composition of the Latex Core

The core of the latex particle, formed in the first polymerization step, comprises a (co)polymer formed from monomer selected from the group consisting of (meth)acrylate monomers selected such that the resultant core particle exhibits a glass transition temperature ($T_g$) of between about −50° C. and about 105° C., preferably between about −25° C. and about 50° C., and most preferably between about −10° C. and about 30° C. The core monomers are chosen to impart both cohesive strength and film-forming properties to the final latex. If the resultant core particle has a $T_g$ of less than about −50° C., the latex particle comprising the core will have inadequate cohesive strength to be useful as a binder or a primer. If the core particle has a $T_g$ greater than about 105° C., the latex particle comprising the core will exhibit insufficient film forming properties to be useful as a binder or a primer. The preferred range is selected in order for the core particles to exhibit the best combination of cohesive strength and film-forming properties. Useful core monomers are selected from the group consisting of alkyl esters of acrylic and methacrylic acid. When the latex core comprises a copolymer, overall proportions of the constituent monomers must be chosen such that the $T_g$ of the resultant copolymer falls within the ranges noted above. Preferably, the monomers from which the core is prepared are selected from the group consisting of methyl acrylate, ethyl acrylate, n-propyl acrylate, i-propyl acrylate, n-butyl acrylate, i-butyl acrylate, isooctyl acrylate, isobornyl acrylate, 2-ethylhexyl acrylate, methyl methacrylate, ethyl methacrylate, n-butyl methacrylate, and mixtures thereof. Most preferably, the core comprises a copolymer of n-butyl acrylate, ethyl acrylate and methyl methacrylate.

The latex core may also optionally further comprise additional ethylenically-unsaturated free-radically polymerizable vinyl comonomer(s) that are copolymerizable with the above-noted (meth)acrylate monomer(s) and which are used to modify the $T_g$ and the polarity of the resultant copolymer. Preferably, the vinyl comonomer is selected from the group consisting of styrene; acrylonitrile; and vinyl esters of from about $C_1$ to about $C_{10}$ linear and/or branched aliphatic organic acids, such as vinyl acetate, vinyl propionate, vinyl neopentanoate, and the like; and mixtures thereof. When present, vinyl comonomers can comprise from about 1 percent to about 20 percent by weight of the total monomers in the core, preferably from about 1 to about 10 percent by weight of the total monomers in the core.

The proportion of the monomer constituents of the latex core can vary, so long as the $T_g$ of the resultant (co)polymer falls within the range prescribed above. It is readily understood by the skilled practitioner that an infinite variety of monomer combinations within the limits described above may be copolymerized in the latex core while maintaining the $T_g$ thereof within the range of the invention.

The latex core represents from about 40 to about 85 percent of the weight of the total core-shell emulsion polymer, preferably from about 50 to about 85 weight percent, and most preferably from about 60 to about 85 weight percent.

II. Composition of the Latex Shell

Consequently, the latex shell comprises from about 15 to about 60 weight percent, preferably from about 15 to about 50 weight percent, and most preferably from about 15 to about 40 weight percent of the overall core-shell emulsion polymer. If the proportional weight of the latex shell is too large, the latex will not be stable and will coagulate. If the proportional weight of the latex shell is too small, there will be insufficient nitrogen functionality on the latex surface to produce the desired binder or primer performance.

Monomers useful for the latex shell are chosen such that the resultant shell exhibits a glass transition temperature ($T_g$) of between about −50° C. and about 105° C., preferably between about −25° C. and about 70° C., and most preferably between about −10° C. and about 50° C. If the $T_g$ of the shell is below about −50° C., the latex will exhibit poor cohesive strength and will not act as an effective binding agent. If the $T_g$ of the shell is above about 105° C., the coated latex will not form a continuous film without adding a coalescing agent.

Monomers useful in the latex shell are chosen for compatibility with the core and to impart nitrogen functionality to the latex for interaction with the substrate and with functionalized (co)polymers (e.g., adhesives, coatings, etc.) with which it may be admixed (when the latex is used as a binder) or on which it may be coated (when the latex is used as a primer). Functionalized (co)polymers include but are not limited to those having one or more electronegative group(s) such as carboxyl, hydroxyl, thiol, thiol acids, halide, etc. Examples thereof include carboxylated acrylate adhesives, ethylene-acrylic acid copolymer film, polyvinylchloride film, etc. Thus, the latex shell typically comprises a copolymer of (meth)acrylate monomer, a nitrogen-containing ethylenically-unsaturated free-radically-polymerizable monomer that is copolymerizable with the (meth)acrylate monomer, and, optionally, a copolymerizable ethylenically-unsaturated silane monomer.

(Meth)acrylate monomers useful in the latex shell are esters of from about $C_1$ to about $C_{14}$ alcohols with acrylic acid or methacrylic acid (herein referred to as "(meth)acrylic acid") including but not limited to those selected from the group consisting of methyl acrylate, ethyl acrylate, n-propyl acrylate, i-propyl acrylate, n-butyl acrylate, i-butyl acrylate, methyl methacrylate, isooctyl acrylate, isobornyl acrylate, 2-ethylhexyl acrylate, ethyl methacrylate and mixtures thereof. Preferably, the (meth)acrylate monomer is selected from the group consisting of methyl acrylate, ethyl acrylate, n-butyl acrylate, methyl methacrylate, and mixtures thereof due to their contribution to the necessary $T_g$ of the latex shell.

Nitrogen-containing ethylenically-unsaturated free-radically-polymerizable monomers that are copolymerizable with the above (meth)acrylate monomers are generally hydrophilic and include but are not limited to those selected from the group consisting of dimethylaminoethyl (meth)acrylate, diethylaminoethyl (meth)acrylate, dimethylaminopropyl (meth)acrylate, 3-dimethylamino-2,2-dimethylpropyl-1 (meth)acrylate, 2-N-morpholinoethyl (meth)acrylate, 2-N-piperidinoethyl (meth)acrylate, N-n-octyl acrylamide, N-t-butyl acrylamide, N-(3-dimethylaminopropyl) (meth)acrylamide, N-(3-dimethylamino-2,2-dimethylpropyl) (meth)acrylamide, N-dimethylaminomethyl (meth)acrylamide, N-dimethylaminoethyl (meth)acrylamide, N-(4-morpholinomethyl) (meth)acrylamide, N,N-dimethyl (meth)acrylamide, N,N-diethyl (meth)acrylamide, N-vinyl pyrrolidone, N-acryloxyethyl pyrrolidone, N-vinyl caprolactam, and mixtures thereof. The term "(meth)acrylate" includes the acrylate ester and the methacrylate ester. Nitrogen-containing monomers used according to the invention must be chosen such that the overall $T_g$ of the latex shell falls within the ranges noted above.

In preparing the latex shell copolymer, the (meth)acrylate monomer comprises from about 40 to about 85 weight percent of the shell, based on the total weight of monomers present in the shell, preferably from about 50 to about 80 weight percent, and most preferably from about 55 to about 75 weight percent. Thus, the nitrogen-containing monomer comprises from about 15 to about 60 weight percent, preferably from about 20 to about 50 weight percent, and most preferably from about 25 to about 45 weight percent of the shell, based on the total weight of the monomers in the shell. In order for the core-shell latex to exhibit adequate binding or priming properties, the percentage of nitrogen-containing monomer must not be less than about 15 weight percent, based on the total weight of monomers in the shell.

Preferably, the nitrogen-containing monomer is selected from the group consisting of dimethylaminoethyl (meth)acrylate, diethylaminoethyl (meth)acrylate, N-t-butyl acrylamide, N,N-dimethylacrylamide, N-vinyl caprolactam, N-vinyl pyrrolidone, and mixtures thereof. Most preferably, the nitrogen-containing monomer is selected from the group consisting of dimethylaminoethyl (meth)acrylate, N,N-dimethylacrylamide, N-vinyl caprolactam, N-vinyl pyrrolidone, and mixtures thereof.

The latex shell further optionally comprises an ethylenically-unsaturated copolymerizable monomeric silane coupling agent in order to increase bonding of the core-shell latex to a substrate on which it may be coated. The silane monomer comprises from about 0 to about 10 percent by weight of the total monomer mixture of the latex shell, typically about 0.01 to about 10 percent by weight when used, preferably from about 0.1 to about 5 percent by weight, and most preferrably from about 0.3 to about 4 percent by weight. Useful copolymerizable silane coupling agents include but are not limited to those selected from the group consisting of trialkoxysilylalkyl (meth)acrylates, vinyl trialkoxy silanes, vinyl triacyloxy silanes, and mixtures thereof. Preferably, the copolymerizable silane coupling agent is selected from the group consisting of gamma-methacryloxypropyl trimethoxysilane (commerically available as "A-174" from Union Carbide Corp.), vinyl triethoxy silane, vinyl triacetoxy silane, and mixtures thereof.

In addition to the (meth)acrylate monomer, the nitrogen-containing monomer, and the optional monomeric silane coupling agent, the latex shell may optionally further comprise copolymerizable ethylenically-unsaturated free-radically polymerizable vinyl comonomer(s). Such vinyl comonomer(s) are employed to modify the $T_g$ and polarity of the latex shell, when appropriate. Useful vinyl comonomers include but are not limited to those selected from the group consisting of styrene; vinyl esters of from about $C_1$ to about $C_{10}$ linear and/or branched aliphatic organic acids, such as vinyl acetate, vinyl propionate, vinyl neopentanoate and the like; and mixtures thereof.

The proportion of the monomer constituents of the latex shell can vary, so long as the $T_g$ of the resultant copolymer falls within the range prescribed above. A particularly useful latex shell has been found to be a copolymer of ethyl acrylate, N-vinyl pyrrolidone, and gamma-methacryloxypropyl trimethoxysilane. A particularly preferred embodiment of the invention is a core-shell emulsion polymer comprising a core of a 4:1 (by weight) ethyl acrylate:methyl methacrylate and a shell of 64:35:1 (by weight) ethyl acrylate:N-vinylpyrrolidone:gamma-methacryloxypropyl trimethoxysilane. The latex shell surrounding the core which coats the core may be continuous or discontinuous.

III. Optional Latex Additives

Various additives well-known in the art may optionally be included in the latex formulation as described above. A particularly useful additive comprises a non-copolymerizable silane coupling agent, which increases bonding of the core-shell latex with the substrate on which it is coated or with other functional polymers co-coated therewith. Examples of non-copolymerizable silane coupling agents which the latex of the invention can further comprise include but are not limited to those selected from the group consisting of glycidyloxyalkyl trialkoxysilanes, (aminoalkylamino)alkyl trialkoxysilanes, aminoalkyl trialkoxysilanes, and mixtures thereof. Preferred examples of silane coupling agents useful in the invention include those selected from the group consisting of gamma-glycidyloxypropyl trimethoxysilane, aminopropyl triethoxysilane, 3-(2-aminoethylamino)ethyl trimethoxysilane, and mixtures thereof. When present, non-copolymerizable silane coupling agents comprise from about 0.1 to about 10 weight percent of the total weight of the latex solids, preferably from about 0.1 to about 5 weight percent, and most preferably from about 0.3 to about 4 weight percent.

Coalescing agents such as those well-known in the art may also be admixed with the latex after its formation in order to insure adequate film formation when the latex is coated onto a substrate. This is particularly important if the final $T_g$ of the core-shell latex is greater than about 40° C. Core-shell latexes exhibiting a $T_g$ higher than about 40° C. remain largely as discrete particles when coated and dried, and thus do not exhibit adequate physical properties, such as cohesive strength and weathering. A coalescing agent facilitates the flowing-together of the latex particles. Useful coalescing agents include but are not limited to those selected from the group consisting of N-methyl pyrrolidone, the CELLOSOLVE™ series of polyether alcohols (available from Union Carbide), the CARBITOL™ series of poly(ethylene glycol) alkyl ethers (available from Union Carbide) and the DOWANOL™ series of poly(ethylene glycol) alkyl ethers (available from Dow Chemicals). Preferably, the coalescing agent is N-methyl pyrrolidone. When used, a coalescing agent comprises from about 5 to about 30 weight percent of the coating solution, based on the total weight of the latex present, preferably from about 10 to about 20 weight percent.

The latex formulation may also further comprise a water-soluble polymeric thickening agent(s) which allow easier coating of the binder or primer. Examples of useful thickening agents include but are not limited to those selected from the group consisting of xanthan gum, hydroxymethylcellulose, hydroxyethylcellulose, hydroxypropylcellulose, poly(acrylamide), poly(vinyl alcohol), poly(ethylene oxide), and the like, and mixtures thereof.

The latex formulation may also further comprise one or more additives which discourage or prevent growth of bacteria in the aqueous coating formulations. A preferred biocide is Kathon™ LX 1.5, a mixture of 5-chloro-2-methyl-4-isothiozoline-3-one and 2-methyl 4-isothiozoline-3-one, available from Rohm and Haas Company. Biocides, when included, are preferably used at a concentration of from about 5 to about 50 pans per million parts of latex.

IV. Emulsifier

Polymerization via emulsion techniques requires the presence of an emulsifier (which may also be called an emulsifying agent or a surfactant). Useful emulsifiers for the present invention include those selected from the group consisting of anionic surfactants, nonionic surfactants, and mixtures thereof.

Useful artionic surfactants include but are not limited to those whose molecluar structure includes at least one hydrophobic moiety selected from the group consisting of from about $C_6$-to about $C_{12}$-alkyl, alkylaryl, and/or alkenyl groups as well as at least one anionic group selected from the group consisting of sulfate, sulfonate, phosphate, polyoxyethylene sulfate, polyoxyethylene sulfonate, polyoxyethylene phosphate, and the like, and the salts of such anionic groups, wherein said salts are selected from the group consisting of alkali metal salts, ammonium salts, tertiary amino salts, and the like. Representative commercial examples of useful anionic surfactants include sodium lauryl sulfate, available from Stepan Chemical Co. as POLYSTEP™ B-3; sodium lauryl ether sulfate, available from Stepan Chemical Co. as POLYSTEP™ B-12; and sodium dodecyl benzene sulfonate, available from Rhone-Poulenc as SIPONATE™ DS-10.

Useful nonionic surfactants include but are not limited to those whose molecular structure comprises a condensation product of an organic aliphatic or alkyl aromatic hydrophobic moiety with a hydrophilic alkylene oxide such as ethylene oxide. The HLB (Hydrophilic-Lipophilic Balance) of useful nonionic surfactants is about 10 or greater, preferably from about 10 to about 20. The HLB of a surfactant is an expression of the balance of the size and strength of the hydrophilic (water-loving or polar) groups and the lipophilic (oil-loving or non-polar) groups of the surfactant. Commercial examples of nonionic surfactants useful in the present invention include but are not limited to nonylphenoxy or octylphenoxy poly(ethyleneoxy) ethanols available from Rhone-Poulenc as the IGEPAL™ CA or CO series, respectively; $C_{11}$–$C_{15}$ secondary-alcohol ethoxylates available from Union Carbide as the TERGITOL™ 15-S series; and polyoxyethylene sorbitan fatty acid esters available from ICI Chemicals as the TWEEN™ series of surfactants.

Most preferably, the emulsion polymerization of this invention is carried out in the presence of a mixture of anionic surfactant(s) and nonionic surfactant(s), wherein the ratio of anionic surfactant:nonionic surfactant is from about 60:40 to about 40:60. A useful range of emulsifier concentration is from about 1 to about 8 weight percent, preferably from about 1.5 to about 7 weight percent, and most preferably from about 2 to about 5 weight percent, based on the total weight of all monomers in both the core and the shell of the latex polymer.

V. Initiator

Water-soluble thermal initiators useful in the present invention are initiators which, on exposure to heat, generate free-radicals which initiate (co)polymerization of the monomers comprising the core and the shell of the latex. Suitable water-soluble thermal initiators include but are not limited to those selected from the group consisting of potassium persulfate, ammonium persulfate, sodium persulfate, and mixtures thereof; and oxidation-reduction initiators such as the reaction product of the above-mentioned persulfates and reducing agents such as those selected from the group consisting of sodium metabisulfite and sodium bisulfite. The preferred water-soluble thermal initiator is potassium persulfate. Preferably, most water-soluble thermal initiators are used at temperatures of from about 50° C. to about 70° C., while the oxidation-reduction-type initiators are preferably used at temperatures of from about 25° to about 50° C. Water-soluble thermal initiators comprise from about 0.05 to about 2 parts by weight, preferably about 0.1 to about 0.5 part by weight based on the total weight of monomers in the emulsion.

VI. Stepwise Emulsion Polymerization

The core-shell latexes of this invention comprise hydrophilic nitrogen-bearing monomers in their shell. Such monomers generally exhibit significant water solubility, and thus present additional challenges if they are to be included at high concentrations in the syntheses of the water-based latexes. N-vinyl pyrrolidone, which is a particularly preferred example of a nitrogen-bearing monomer, presents further challenges due to its reactivity relative to acrylate monomers such as ethyl acrylate. We describe below the particular case of preparation of a core-shell latex comprising N-vinyl pyrrolidone in the latex shell.

A flask is charged with water and one or more surfactants and stirred and heated under an inert atmosphere such as a nitrogen blanket. When the temperature reaches about 55° C., all of the first-stage (core) monomers are added, under vigorous agitation. When the aqueous mixture has reached about 60° C., the initiator is added and the reaction is allowed to exotherm. At peak temperature, the second-stage (shell) monomer mixture is added to the stirred flask over a one-hour period while the reaction temperature is maintained at about 80° C. After two additional hours of heating, the mixture is cooled quickly to room temperature (about 23° C.) and the latex is collected.

The polymerization procedure was developed to accomodate several difficult factors. For example, the polymerization of N-vinyl pyrrolidone under acidic conditions produces acetaldehyde, which adversely affects the polymerization reaction. Thus, care is taken to maintain alkaline conditions when N-vinyl pyrrolidone is used as the nitrogen-bearing monomer. Second, the relative reactivities of N-vinyl pyrrolidone and ethyl acrylate are such that, under batch emulsion polymerization conditions, ethyl acrylate homopolymerizes much faster than it reacts with N-vinyl pyrrolidone and, in the later stages of the reaction, homopolymeric N-vinyl pyrrolidone causes coagulation and destabilization of the latex. However, to achieve the desired functionality of the final core-shell latex, it is necessary to include a relatively high concentration of N-vinyl pyrrolidone in the shell layer. Dropwise addition of the shell-monomer mixture allows for incorporation of N-vinyl pyrrolidone into its copolymer before any significant concentration of its homopolymer can be formed.

VII. Core-Shell Latex Uses

The core-shell latex polymers of this invention have a number of uses. For example, they are useful as binder materials for various coated constructions. Articles of commerce which comprise an adhesive coated onto a backing often exhibit a tendency for the adhesive to become delaminated from its backing and remain on the substrate after prolonged standing or under adverse conditions of heat and/or humidity. (This so-called "adhesive transfer" can be essentially eliminated when the latex of the present invention is admixed with the adhesive prior to its coating onto the backing.) The amount of latex admixed is typically between about 4% by weight of the solids to about 20% by weight of solids. The latex of the invention, with a nitrogen-bearing monomer in the shell, is an effective binder or primer for any adhesive which bears at least one free carboxyl group (a carboxylated adhesive) and is less effective if no free carboxyl group is present in the adhesive. Alternatively, the core-shell latex may be applied to a backing in an initial or "primer" coating, followed by coating with the adhesive. Because of the available nitrogen functionality on the shell, a number of similar uses are possible, wherein the functionality of the shell and the physical properties of the core to bind two or more materials together in a functional coating.

Examples of suitable backings include but are not limited to those selected from the group consisting of polyethyleneterephtalate (PET), plasticized polyvinylchloride film, polypropylene, polyethylene, paper, and woven and non-woven cloth.

TEST METHODS

Microsphere Adhesive Transfer

Microsphere adhesive transfer for the purposes of this test is defined as the amount of microsphere adhesive that transfers to an applied paper when a microsphere adhesive coated sample is removed from the paper. It is measured as the percent of the area of the applied paper covered with microspheres. The procedure followed is: A 19 cm wide strip of microsphere adhesive coated sample is adhered to a clean area of a commercially available clay-coated paper (KROMECOTE™ paper, available from International Paper Co.) for a few seconds using the mechanical rolling action provided by a Tag and Label Manufacturing Institute (TLMI) release and adhesion tester and then is removed at a 90° angle at a constant rate of 35.4 cm/min. The clay-coated paper is then surveyed by an image processor through a video camera and the percent microsphere adhesive coverage of the viewed area is recorded. The recorded data is reported as the average percentage of the area covered by microspheres.

Adhesive transfer for both the binders and primers were tested before and after aging in an oven at 65° C. and 80% relative humidity for 14 days. The amount of adhesive transfer was measured by optical microscopy. Results are presented in Table I.

Samples of binders and primers of the invention to be tested for adhesive transfer were coated onto plain bond paper at the weight specified in each example, then dried on a hot drum at 80° C. at a traveling rate of 15 meters/rain (5 seconds approximate dwell time on the drum). The primers were overcoated with adhesive formulations as described in the Examples prior to testing.

EXAMPLES

The following Examples illustrate the practice of the present invention but should not be construed as limiting its scope. All parts, percentages, ratios, etc. in the Examples and the rest of the specification are by weight unless otherwise specified.

Microsphere Adhesive "A"

The polymeric carboxylated microsphere adhesive used in the Examples was prepared according to U.S. Pat. No. 5,045,569, assigned to the assignee of the present case, incorporated by reference herein, as follows: A suspension of 141 g isooctyl acrylate, 0.04 g 1,4-butanedioldiacrylate, 9.0 g acrylic acid and 0.5 g benzoyl peroxide in 450 g deionized water was stirred under argon at 400 rpm. After the peroxide had dissolved, 1.5 g ammonium lauryl sulfate were added and the temperature of the reactor was raised to 60° C. and maintained at that temperature for 22 hours, under continuous argon purge. The suspension was then allowed to cool to room temperature and the hollow carboxylic acid microspheres were collected.

Microsphere Adhesive Formulation "B"

A sample of the Microsphere Adhesive of A was formulated into a 34% solids aqueous slurry comprising 95% by weight Microsphere Adhesive "A" and 5% by weight KALZAN™ xanthan gum (available from Kelco Co.). The sample was coated onto bond paper at 1.97 g/sq meter dry weight and evaluated according to the Microsphere Adhesive Test Method. The adhesive microsphere transfer was 2.5%.

EXAMPLE 1

Preparation of a Core-Shell Latex Polymer

A mixture of 78.92 parts deionized water, 0.30 part SIPONATE™ DS-10 anionic surfactant (sodium dodecyl benzene sulfonate, available from Rhone-Poulenc), 0.28 part ICEPAL™ CA-897 nonionic surfactant (octylphenoxypoly-(ethyleneoxy)ethanol, from Rhone Poulenc), and 0.13 part ammonium hydroxide (29% aqueous solution) was stirred and heated under nitrogen in a 4-neck flask equipped with a reflux condenser, thermometer, mechanical stirrer, metering pump and a thermometer. When the temperature of the mixture reached 55° C., a solution of 13 parts ethyl acrylate and 3.23 parts methyl methacrylate was added all at once to the flask contents, with vigorous agitation. The mixture was heated to 60° C. and 0.07 part potassium persulfate were added. The reaction was allowed to exotherm, then was kept at 80° C. while a mixture of 2.65 parts ethyl acrylate and 1.42 parts N-vinyl pyrrolidone was dripped in over a one-hour period. The reaction mixture was agitated and maintained at 80° C. for an additional two hours, after which it was quickly cooled to 25° C. and filtered to collect the stable latex polymer. Solids analysis showed 99.8% conversion of monomers. The proportions of components used corresponded to an 80:20 ratio of ethyl acrylate:methyl methacrylate in the particle core, a 65:35 ratio of ethyl acrylate:N-vinyl pyrrolidone in the particle shell, and an overall 80:20 ratio of core: shell based on the initial charge of reactants.

EXAMPLE 2

Preparation of a Core-Shell Latex Polymer

The preparation as described in Example 1 was repeated, except that N,N-dimethyl acrylamide was substituted for N-vinyl pyrrolidone in the shell copolymer. All ratios of monomers in the core and the shell, and the weight ratio of core:shell remained the same as in Example 1. The latex polymer was stable, and the overall conversion of monomers was 99.7% as determined by solids analysis.

EXAMPLE 3

Preparation of a Core-Shell Latex Polymer

The preparation as described in Example 1 was repeated, with the following changes: For the core copolymer were used 12.17 parts methyl acrylate (MA) and 4.06 parts butyl acrylate (BA); for the shell copolymer were used 1.63 parts methyl acrylate (MA), 1.02 parts butyl acrylate (BA) and 1.42 parts N-vinyl pyrrolidone (NVP). Essentially quantitative conversion of monomers was observed and the polymer latex was stable. These proportions correspond to a 75:25 ratio of MA:BA in the core, a 40:25:35 ratio of MA:BA:NVP in the shell, and an overall core:shell ratio of 80:20.

EXAMPLE 4

Core-Shell Latex Polymer an Adhesive Binding Agent

In order to test the ability of the core-shell latex polymer of the present invention to act as a binding agent and prevent adhesive transfer, an aqueous adhesive coating was prepared comprising the core-shell latex of Example 1 and the carboxylated Microsphere Adhesive "A" (6% acrylic acid). The aqueous adhesive coating was made at 34% solids, 4% of which was the core-shell latex of Example 1, coated at 6.46 g/sq meter dry weight, and evaluated according to the Microsphere Adhesive Test Method.

Adhesive microsphere transfer for Microsphere Adhesive Formulation "B" (absence of a core-shell latex binder) was 2.5%, whereas the adhesive microsphere transfer for the adhesive formulation of Example 4, containing the core-shell latex binder, was 0.5.

COMPARATIVE EXAMPLE 5

Core-Shell Latex having Nitrogen-Free Shell

In order to demonstrate the necessity for a nitrogen-functional monomer in the shell of the core-shell latex of the invention, a core-shell latex was produced in which the shell was formed entirely from ethyl acrylate. Thus, the procedure of Example 1 was repeated except that 4.07 parts ethyl acrylate alone were added to form the latex shell. N-vinyl pyrrolidone was not included. The resultant core-shell latex was included in the formulations of Comparative Examples 6 and 8. Results are reported in Table I.

COMPARATIVE EXAMPLE 6

Preparation of a Primer Coating Comprising a Core-Shell Latex Having Nitrogen-Free Shell An aqueous primer coating was prepared from the latex of Comparative Example 5. A 14% solids slurry comprising of 95% by weight of the latex of Comparative Ex. 5 and 5% by weight KALZAN™ xanthan gum (available from Kelco Co.) was formed. The aqueous primer coating was coated onto bond paper at 10.76 g/sq meter dry weight.

To test the effectiveness of the primer coating, the coated bond paper was overcoated with a 34% solids aqueous mixture of the carboxylated Microsphere Adhesive "A" (4.3% acrylic acid) containing 4% HYCAR™ 2600-222 acrylamide-type latex binder (B. F. Goodrich) at 6.99 g/sq meter dry weight. Microsphere adhesive transfer results are reported in Table I.

EXAMPLE 7

Preparation of a Primer Coating Comprising Core-Shell Latex Having Nitrogen-Containing shell The core-shell latex of Example 1 was made into a 14% aqueous slurry comprising 95% by weight latex of Example 1 and 5% by weight KALZAN™ xanthan gum (available from Kelco Co.). The aqueous slurry was coated onto bond paper at 10.76 g/sq meter dry weight. The effectiveness of the primer coating was tested as in Comparative Example 6. Microsphere adhesive transfer results are reported in Table I.

COMPARATIVE EXAMPLE 8

Preparation of a Nitrogen-Free Binder

A 34% solids aqueous mixture of 89.2 wt % carboxylated Microsphere Adhesive "A" (4.3% acrylic acid), 10 wt % latex of Comparative Example 5, and 0.8 wt % KALZAN™ xanthan gum (available from Kelco Co.) viscosity modifier was prepared. The aqueous mixture was coated at 8.61 g/sq meter dry weight on bond paper and evaluated according to the Micro sphere Adhesive Test Method. Microsphere adhesive transfer results are reported in Table I.

EXAMPLE 9

Preparation of a Nitrogen-Containing Binder

A 34% solids aqueous mixture of 89.2 wt % carboxylated microsphere adhesive of Example A (4.3% acrylic acid), 10 wt % latex of Example 1, and 0.8 wt % KALZAN xanthan gum (available from Kelco Co.) viscosity modifier was coated at 8.61 g/sq meter dry weight on bond paper and evaluated according to the Microsphere Adhesive Test Method. Microsphere adhesive transfer results are reported in Table I.

EXAMPLE 10(a)–(b)

Core-Shell Latex Containing Monomeric Silane Coupling Agent

A core-shell latex was prepared according to the procedure of Example 1 with the exception that 1% of the ethyl acrylate used in preparing the shell copolymer was replaced by gamma-methacryloxypropyl trimethoxysilane, available as "A-174" from Union Carbide Corp. Thus, the shell formulation comprised 2.60 g ethyl acrylate, 1.42 g N-vinyl pyrrolidone, and 0.04 g silane coupling agent, rendering the composition of the shell to be 64:35:1, respectively, while maintaining the core:shell ratio at 80:20. Test results for formulations of this latex as a binder and as a primer coating, following the procedures of Examples 7 and 9, are reported in Table I, as 10(a) and 10(b), respectively.

TABLE I

| Example | % Adhesive Transfer, Unaged | % Adhesive Transfer, Aged |
| --- | --- | --- |
| Comp. Ex. 6 - Primer | 2.3 | 4.3 |
| Ex. 7 - Primer | 0.2 | 0.1 |
| Comp. Ex. 8 - Binder | 4.7 | 5.4 |
| Ex. 9 - Binder | 0.2 | 0.3 |
| Ex. 10(a) - Primer | 0.0 | 0.1 |
| Ex. 10(b) - Binder | 0.1 | 0.1 |

The test results in Table I demonstrate the effect of a nitrogen-functional comonomer in the latex shell in decreasing adhesive transfer and in effecting resistance to transfer under conditions of heat and humidity. Comparative Examples 6 and 8 are particularly noteworthy, in that the overcoated adhesive formulations include 4% of a Hycar™ latex as a shear stabilizer during the coating process. The Hycar™ latex is used in the art as an agent for reduction of adhesive transfer, yet formulations using the latex of the present invention showed an order of magnitude reduction in adhesive transfer over the Hycar™ formulations, and even greater reductions after aging.

While this invention has been described in connection with specific embodiments, it should be understood that it is capable of further modification. The claims herein are intended to cover those variations which one skilled in the art would recognize as the chemical equivalent of what has been described herein.

What is claimed:

1. A core-shell latex composition comprising latex particles, each latex particle comprising:
   (a) a core comprising a (co)polymer comprising (meth) acrylate ester wherein the (co)polymer has a glass transition temperature of about −50° C. to about 105° C.;
   (b) a shell, surrounding the core, comprising a copolymer, wherein the copolymer consists essentially of:
      (i) a nitrogen-bearing ethylenically-unsaturated free-radically polymerizable monomer;
      (ii) at least one (meth)acrylate ester of about a $C_1$ to about a $C_{14}$ alcohol; and
      (iii) an optional ethylenically-unsaturated free-radically polymerizable silane monomer; wherein the nitrogen-bearing ethylenically-unsaturated free-radically polymerizable monomer comprises from about 15 to about 60 percent by weight of the shell and further wherein the core comprises from about 40 to about 85 percent or the weight of the total core-shell latex particles; wherein each latex particle has only one shell.

2. The core-shell latex composition of claim 1 wherein the core comprises a (co)polymer of monomer selected from the group consisting of methyl acrylate, ethyl acrylate, n-butyl acrylate, isooctyl acrylate, isobornyl acrylate, methyl methacrylate, and mixtures thereof.

3. The core-shell latex composition of claim 1 wherein the nitrogen-bearing ethylenically-unsaturated free-radically polymerizable monomers of the shell are selected from the group consisting of dimethylaminoethyl (meth)acrylate, diethylaminoethyl (meth)acrylate, dimethylaminopropyl (meth)acrylate, 3-dimethylamino-2,2-dimethylpropyl-1 (meth)acrylate, 2-N-morpholinoethyl (meth)acrylate, 2-N-piperodinoethyl (meth)acrylate, t-butyl acrylamide, n-octyl acrylamide, N-(3-dimethylaminopropyl) (meth)acrylamide, N-(3-dimethylamino-2,2-dimethylpropyl) (meth)acrylamide, N-dimethylaminomethyl (meth)acrylamide, N-dimethylaminoethyl (meth)acrylamide, N-(4-morpholinomethyl) (meth)acrylamide, N,N-dimethyl (meth)acrylamide, N,N-diethyl (meth)acrylamide, N-acryloxyethyl pyrrolidone, and N-vinyl pyrrolidone, N-vinyl caprolactam, and mixtures thereof.

4. The core-shell latex composition of claim 3 wherein the nitrogen-bearing ethylenically-unsaturated free-radically polymerizable monomer is selected from the group consisting of N-vinyl pyrrolidone, N-vinyl caprolactam, dimethylaminoethyl methacrylate, and N,N-dimethyl acrylamide.

5. The core-shell latex composition of claim 1 wherein the (meth)acrylate ester of the shell is selected from the group consisting of methyl acrylate, ethyl acrylate, n-butyl acrylate, methyl methacrylate, and mixtures thereof.

6. The core-shell latex composition of claim 1 wherein the ethylenically-unsaturated free-radically copolymerizable silane monomer is selected from the group consisting of trialkoxysilylalkyl (meth)acrylates, vinyl trialkoxy silanes, vinyl triacyloxy silanes, and mixtures thereof.

7. The core-shell latex composition of claim 6 wherein the copolymerizable silane monomer is selected from the group consisting of gamma-methacryloxypropyl trimethoxysilane, vinyl triethoxy silane, vinyl triacetoxy silane, and mixtures thereof.

8. The core-shell latex composition of claim 1 wherein the (co)polymer of the core, the copolymer of the shell, or both, independently further comprises a copolymerizable ethylenically-unsaturated free-radically polymerizable vinyl comonomer.

9. The core-shell latex composition of claim 8 wherein the vinyl comonomer is selected from the group consisting of styrene, vinyl esters of from about $C_1$ to about $C_{10}$ linear aliphatic organic acids, vinyl esters of from about $C_1$ to about $C_{10}$ branched aliphatic organic acids, and mixtures thereof.

10. The core-shell latex composition of claim 9 wherein the vinyl comonomer is selected from the group consisting of styrene, vinyl acetate, vinyl propionate, vinyl neopentanoate, and mixtures thereof.

11. The core-shell latex composition of claim 1 which further comprises a non-copolymerizable silane coupling agent and a coalescing agent.

12. The core-shell latex composition of claim 11 in which the non-copolymerizable silane coupling agent is selected from the group consisting of glycidyloxyalkyl trimethoxysilanes, (aminoalkylamino)alkyl trimethoxysilanes, aminoalkyl triethoxysilanes, and mixtures thereof.

13. The core-shell latex composition of claim 11 in which the coalescing agent is selected from the group consisting of N-methyl pyrrolidone, polyether alcohols, poly(ethylene glycol) alkyl ethers, and mixtures thereof.

14. An adhesive formulation comprising the core-shell latex composition of claim 1.

15. A substrate coated on at least one side with the adhesive formulation of claim 14.

16. A substrate coated on at least one side with a coating comprising the core-shell latex composition of claim 1.

17. The substrate of claim 16 further comprising a functionalized copolymer having at least one electronegative group coated over said core-shell latex composition.

* * * * *

UNITED STATES PATENT AND TRADEMARK OFFICE
CERTIFICATE OF CORRECTION

PATENT NO.: 5,461,125

DATED: October 24, 1995

INVENTOR(S): Ying-Yuh Lu et al.

It is certified that error appears in the above-identified patent and that said Letters Patent is hereby corrected as shown below:

Col. 1, line 54, after "stage" insert --polymer becomes--.

Col. 6, line 63, "pans" should be --parts--.

Col. 7, line 4, "artionic" should be --anionic--.

Col. 9, line 38, "rain" should be --min--.

Signed and Sealed this

Ninth Day of April, 1996

Attest:

BRUCE LEHMAN

Attesting Officer

Commissioner of Patents and Trademarks